US008468094B2

(12) United States Patent
Sakamura et al.

(10) Patent No.: US 8,468,094 B2
(45) Date of Patent: Jun. 18, 2013

(54) ELECTRONIC VALUE EXCHANGE SYSTEM, MOBILE TERMINAL, AND ELECTRONIC VALUE EXCHANGE METHOD

(75) Inventors: Ken Sakamura, Tokyo (JP); Noboru Koshizuka, Tokyo (JP); Kensaku Mori, Yokohama (JP); Masayuki Terada, Yokosuka (JP); Kazuhiko Ishii, Yokohama (JP); Sadayuki Hongo, Yokohama (JP)

(73) Assignees: NTT DoCoMo, Inc., Tokyo (JP); Ken Sakamura, Tokyo (JP); Noboru Koshizuka, Musashino-shi (JP)

( * ) Notice: Subject to any disclaimer, the term of this patent is extended or adjusted under 35 U.S.C. 154(b) by 1184 days.

(21) Appl. No.: 11/578,845

(22) PCT Filed: Apr. 21, 2005

(86) PCT No.: PCT/JP2005/007643
§ 371 (c)(1),
(2), (4) Date: Aug. 29, 2007

(87) PCT Pub. No.: WO2005/103974
PCT Pub. Date: Nov. 3, 2005

(65) Prior Publication Data
US 2008/0163251 A1 Jul. 3, 2008

(30) Foreign Application Priority Data
Apr. 21, 2004 (JP) .............................. P2004-126047

(51) Int. Cl.
*G06Q 40/00* (2012.01)

(52) U.S. Cl.
USPC ........................................... 705/41; 455/558

(58) Field of Classification Search
USPC ....................... 705/41; 455/41, 466, 418, 558
See application file for complete search history.

(56) References Cited

U.S. PATENT DOCUMENTS

| 2003/0036355 A1* | 2/2003 | Gundlach ........................ 455/41 |
| 2003/0125054 A1* | 7/2003 | Garcia ........................... 455/466 |
| 2003/0228886 A1* | 12/2003 | Ishii et al. ..................... 455/558 |
| 2004/0242216 A1* | 12/2004 | Boutsikakis ................... 455/418 |
| 2006/0097037 A1 | 5/2006 | Sakamura et al. |

FOREIGN PATENT DOCUMENTS

| EP | 1 221 669 A1 | 7/2002 |
| EP | 1 703 457 A2 | 9/2006 |
| JP | 9-511350 | 11/1997 |
| WO | WO 95/30211 | 11/1995 |
| WO | WO 03/105040 A1 | 12/2003 |

* cited by examiner

*Primary Examiner* — Samica L Norman
(74) *Attorney, Agent, or Firm* — Oblon, Spivak, McClelland, Maier & Neustadt, L.L.P.

(57) ABSTRACT

An electronic value exchange system 100 comprises a mobile terminal 10 and a mobile terminal 20. The mobile terminal 10 causes a driver 12 to transmit an exchange offer message of electronic value V1, V2 to the mobile terminal 20. The mobile terminal 20 stores handlers that the driver 12 can execute in relationship to a message in a common table 221, and acquires a handler corresponding to the above-mentioned offer message, and notifies the exchange offer contents based on the handler to an application program 21. If the application program 21 consents to the offer contents according to the operation of a user, the electronic value V2 stored in an IC card 23 is transmitted to an IC card 13 via a driver 22 and the driver 12.

6 Claims, 4 Drawing Sheets

| | 121a | 121b | 121c |
|---|---|---|---|
| | MESSAGE | HANDLER | CALLBACK FUNCTION (PARAMETER) |
| | 0X03 (OFFER) | NOTIFY TO AP11 | cfm−prop(V1,V2) |
| | 0X05 (CONFIRM) | TRANSMIT TO ICC23 | NONE |
| | 0X10 (COMMIT) | NOTIFY TO AP11 | inform−ap(state) |
| | ⋮ | ⋮ | ⋮ |
| | 0X11 (COMMITED) | NOTIFY TO AP11 | inform−ap(state) |
| | ⋮ | ⋮ | ⋮ |

(b)

221

| | 221a | 221b | 221c |
|---|---|---|---|
| | MESSAGE | HANDLER | CALLBACK FUNCTION (PARAMETER) |
| | 0X03 (OFFER) | NOTIFY TO AP21 | cfm−prop(V1,V2) |
| | 0X05 (CONFIRM) | TRANSMIT TO ICC13 | NONE |
| | 0X10 (COMMIT) | NOTIFY TO AP21 | inform−ap(state) |
| | ⋮ | ⋮ | ⋮ |
| | 0X11 (COMMITED) | NOTIFY TO AP21 | inform−ap(state) |
| | ⋮ | ⋮ | ⋮ |

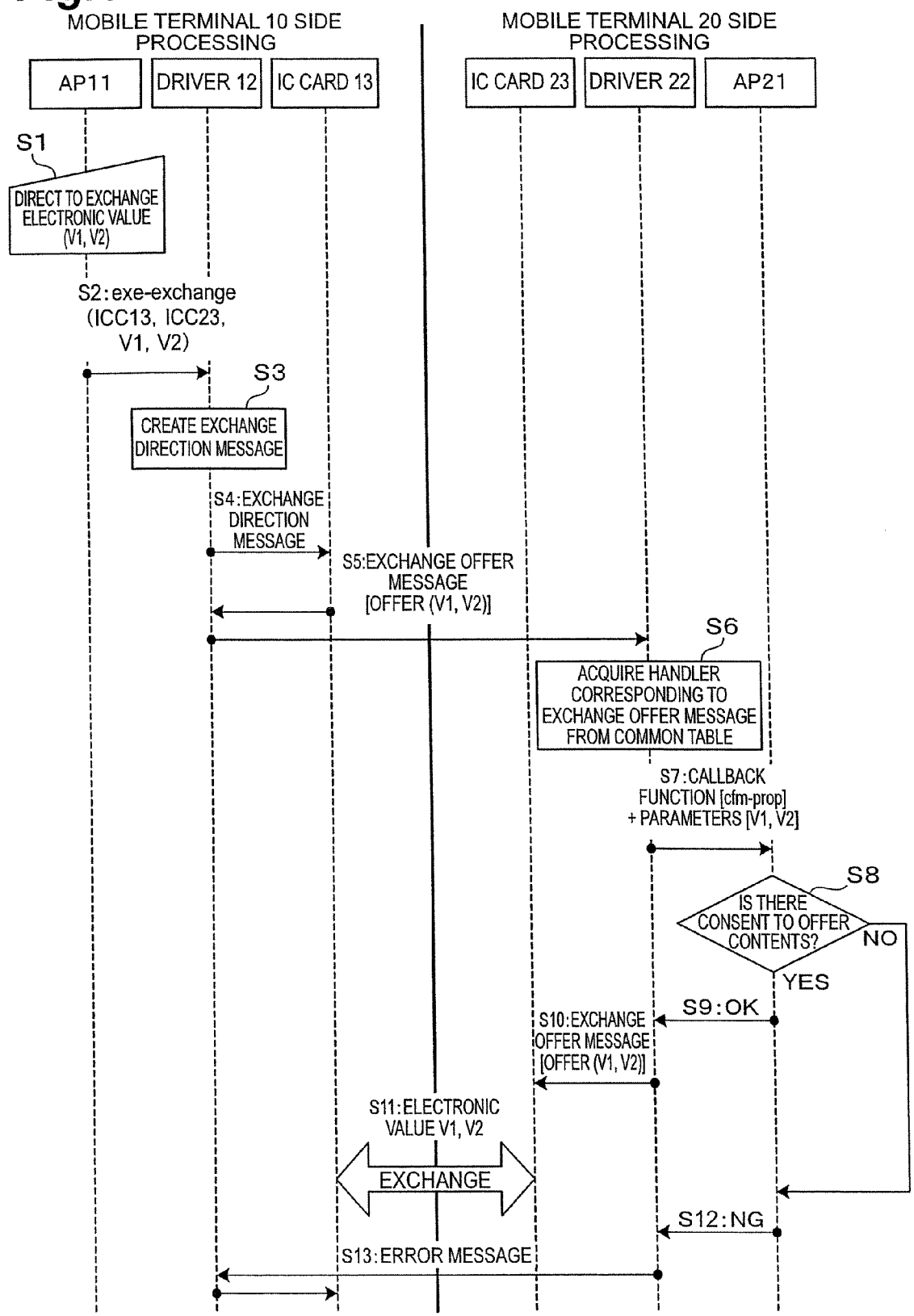

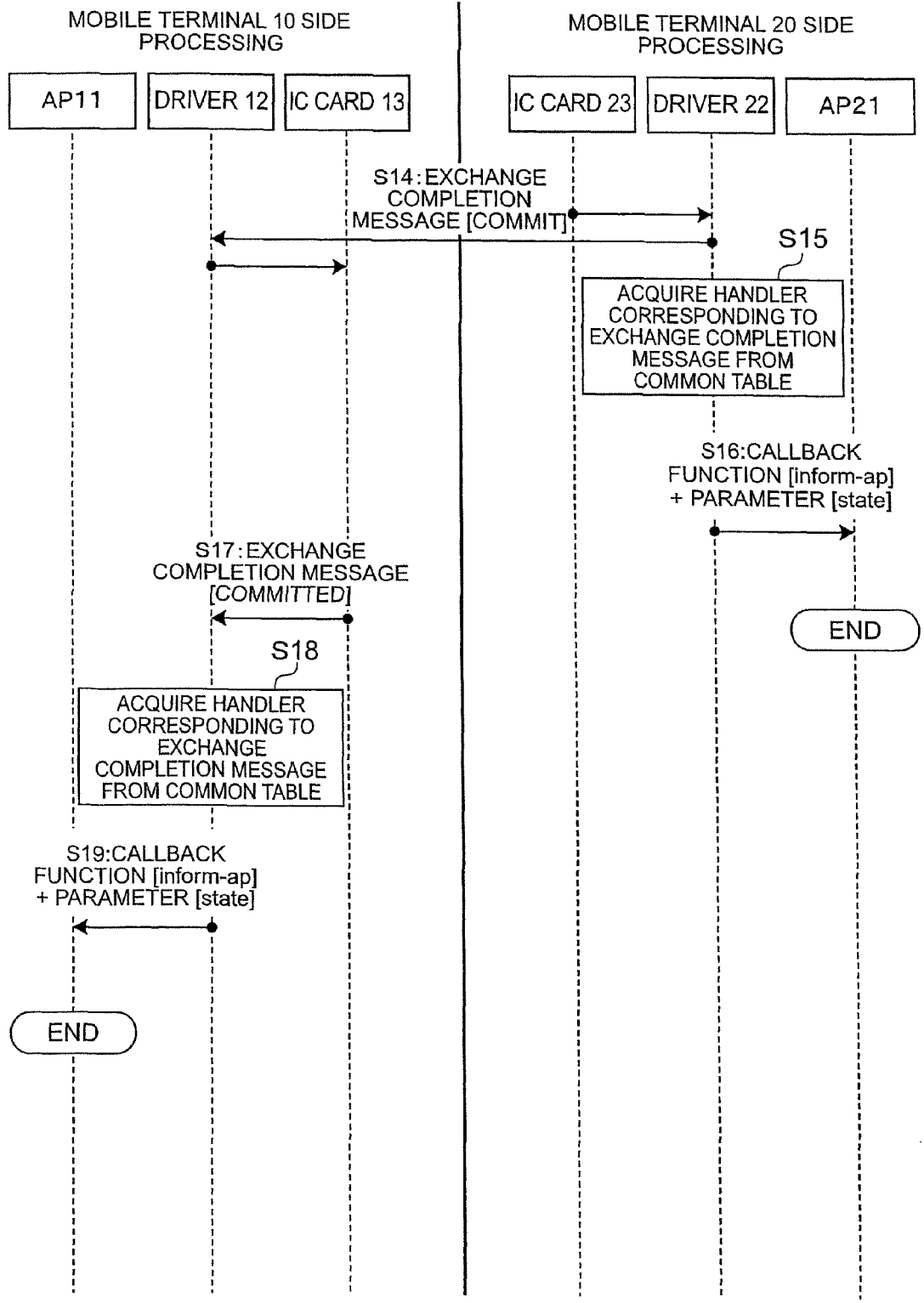

ELECTRONIC VALUE EXCHANGE SYSTEM, MOBILE TERMINAL, AND ELECTRONIC VALUE EXCHANGE METHOD

TECHNICAL FIELD

The present invention relates to a technique to exchange electronic value between different communication terminals.

BACKGROUND ART

Recently, the research on TRON (The Real-time Operating system Nucleus) is being developed as a means to realize an environment of ubiquitous computing. In particular, a mobile terminal that incorporates an IC (Integrated Circuit) card, such as an e-TRON card, does not require an application program when giving and receiving electronic value, such as electronic money and electronic coupon, between terminals, and a technique to perform transmission and reception of value directly between IC cards of both terminals has been proposed. As a system that has applied such a technique to charging of electronic value to make up the deficit, for example, an electronic value charging system having both high security and simplicity is disclosed in patent document 1.

Patent document 1: Japanese Patent Application Laid-Open No. 2003-337887

DISCLOSURE OF THE INVENTION

However, in the above-mentioned prior art, exchange of electronic value is effected directly between IC cards having tamper-resistant properties. Due to this, while high security can be secured, there is a possibility of a problem in that the operation of the IC card side cannot be grasped at all times by the application program side. For example, the IC card is a black box, therefore, the user of a terminal grasps the details processed through the application program, and however, it is not possible to present necessary information to the user unless the process state is notified to the application program.

Therefore, an object of the present invention is to avoid a trouble that the processing performed on the IC card side or disconnection of communication between the IC cards cannot be recognized by the application program, when a terminal device having the application program outside the IC card effects exchange of electronic value between the IC cards.

An electronic value exchange system according to the present invention is an electronic value exchange system for effecting exchange of electronic value held in an IC card of each terminal between a sender side terminal and a receiver side terminal, wherein: the sender side terminal comprises a transmission means for transmitting an exchange offer message offering exchange of the electronic value to the receiver side terminal; and the receiver side terminal comprises: a storage means for storing a handler indicating the contents of processing to be executed in relationship to a message; a notification means for, upon receipt of the exchange offer message transmitted by the transmission means, acquiring a handler corresponding to the exchange offer message from the storage means to notify the offer contents based on the handler to an application program; and an exchange means for effecting exchange of electronic value by transmitting the electronic value to the sender side terminal when the consent for the offer contents notified by the notification means is obtained from the application program.

A mobile terminal according to the present invention is a mobile terminal for effecting exchange of electronic value held in an IC card of the own terminal with another mobile terminal, comprising: a storage means for storing a handler indicating the contents of processing to be executed in relationship to a message; a notification means for, upon receipt of an exchange offer message offering exchange of the electronic value transmitted from said another mobile terminal, acquiring a handler corresponding to the exchange offer message from the storage means to notify the offer contents based on the handler to an application program; and an exchange means for effecting exchange of electronic value by transmitting the electronic value to said another mobile terminal when the consent for the offer contents notified by the notification means is obtained from the application program.

An electronic value exchange method according to the present invention is an electronic value exchange method comprising: a transmission step in which a sender side terminal transmits an exchange offer message for offering exchange of electronic value to a receiver side terminal; a notification step in which the receiver side terminal having a storage means for storing a handler indicating the contents of processing to be executed in relationship to a message, upon receipt of the exchange offer message transmitted in the transmission step, acquires a handler corresponding to the exchange offer message from the storage means and notifies the offer contents based on the handler to an application program; and an exchange step in which, when the consent for the offer contents notified in the notification step is obtained from the application program, exchange of electronic value is effected by transmitting the electronic value to the sender side terminal.

According to the present invention, upon receipt of an offer to exchange electronic value held in the IC card of the own terminal with electronic value in the IC card of the sender side terminal (another mobile terminal) from the sender side terminal, the receiver side terminal (the mobile terminal) notifies the offer to the application program of the own terminal. If the application program returns an affirmative reply to the offer contents by the operation by the user of the receiver side terminal etc., the receiver side terminal performs transmission of electronic value to the sender side terminal. At the same time, electronic value is transmitted also from the sender side terminal and exchange of electronic value is completed. As described above, the direct exchange processing of electronic value between the IC cards is executed after the consent/refusal judgment by the application program stored in the receiver side terminal. Therefore, it is made possible for the application program side to asynchronously recognize the processing executed between the IC cards.

In the electronic value exchange system according to the present invention, it is preferable for the notification means to, when detecting that the exchange of the electronic value is completed, acquire a handler corresponding to an exchange completion message from the storage means and notify the completion of exchange to the application program and the sender side terminal in accordance with the handler.

Further, in the mobile terminal according to the present invention, it is preferable for the notification means to, when detecting that the exchange of the electronic value is completed, acquire a handler corresponding to an exchange completion message from the storage means and notify the completion of exchange to the application program and said another mobile terminal in accordance with the handler.

According to the present invention, when exchange of electronic value is completed, this is notified to the application program of the receiver side terminal (the mobile terminal). In addition, by the direction from the notification means of the receiver side terminal, the application program of the sender side terminal (said another mobile terminal) is also notified thereof. Therefore, even in the case where exchange of electronic value is not completed normally for some reason, such as disconnection of communication, this can be recognized by both the sender terminal and the receiver terminal. Due to this, it is possible to avoid in advance an unfair state in which, for example, the electronic value recognized by the sender side to have been sent is actually not received by the receiver side, or despite that the IC card of one of the sides has received electronic value, the other has not, etc.

According to the present invention, it is made possible to avoid a trouble due to the problem that the processing performed on the IC card side or disconnection of communication between the IC cards cannot be recognized by the application program, when a terminal device having the application program outside the IC card effects exchange of electronic value between the IC cards.

BRIEF DESCRIPTION OF THE DRAWINGS

FIG. 2 is a diagram showing an example of data storage in a common table held by a mobile terminal, wherein FIG. 2(a) is an example of data storage in a common table held by a driver of a sender side terminal of electronic value and FIG. 2(b) is a diagram showing an example of data storage in a common table held by a driver of a receiver side terminal of electronic value.

FIG. 3 is a first half portion of a flow chart for explaining the operation of an electronic value exchange system.

FIG. 4 is a second half portion of the flow chart for explaining the operation of the electronic exchange system.

Figure 1:
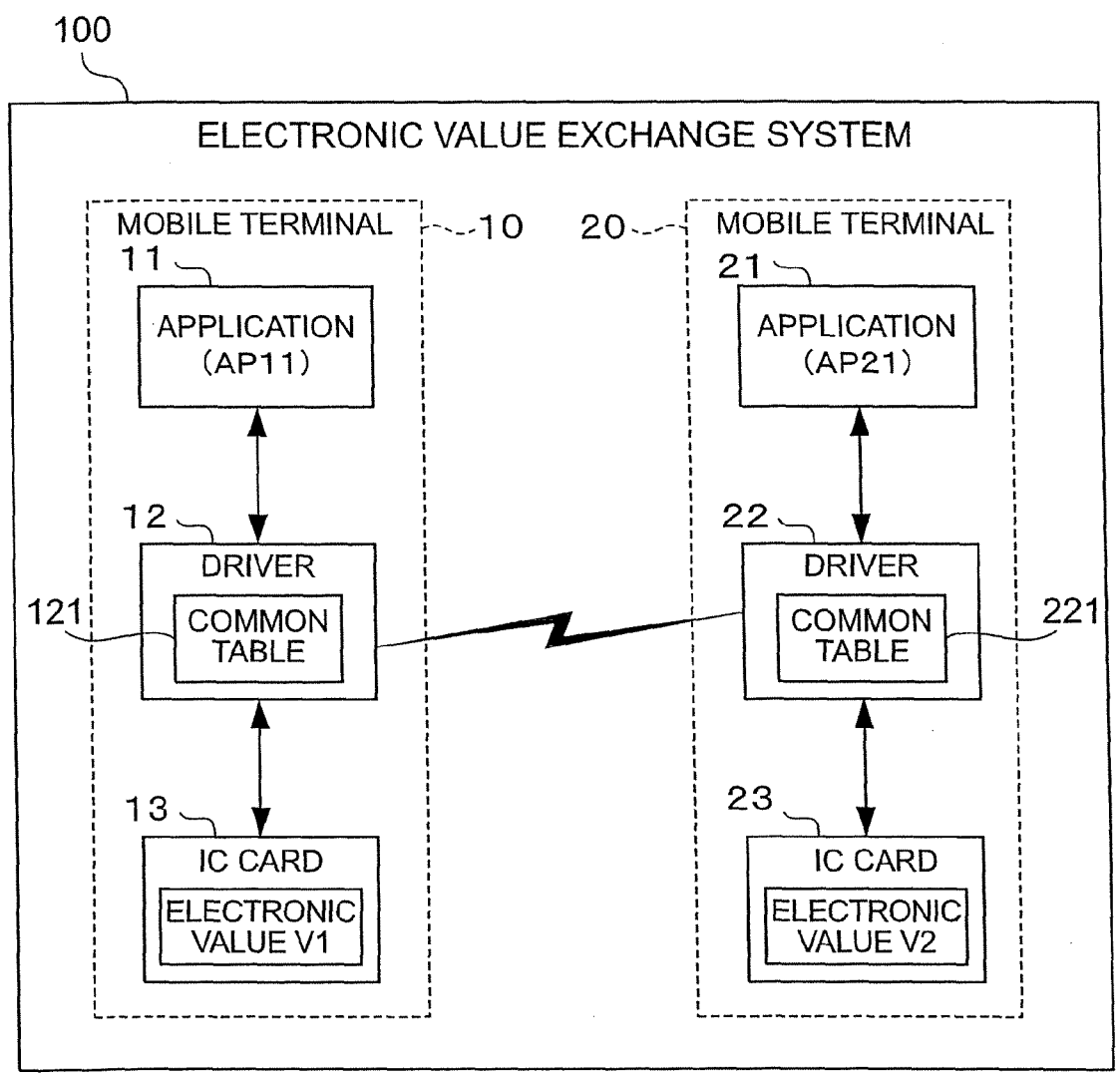
FIG. 1 is a diagram showing a configuration of an electronic value exchange system.

DESCRIPTION OF THE REFERENCE SYMBOLS 10, 20 mobile terminal
11, 21 application program
12, 22 driver
121, 221 common table
13, 23 IC card
100 electronic value exchange system
V1, V2 electronic value

BEST MODES FOR CARRYING OUT THE INVENTION

Embodiments of the present invention will be explained below with reference to the drawings accompanied for illustration. First, a configuration of an electronic value exchange system 100 in the present embodiment is explained. As shown in FIG. 1, the electronic value exchange system 100 comprises a mobile terminal 10 (a sender side terminal, corresponding to another mobile terminal) and a mobile terminal 20 (corresponding to a receiver side terminal). The mobile terminals 10, 20 are, for example, mobile phones or PDAs (Personal Digital Assistance), however, provided that a terminal device has a communication function, there is no limitation imposed by its function and use. The mobile terminal 10 and the mobile terminal 20 are configured so as to be capable of transmission and reception of electronic value via a short-range radio communication channel using a driver possessed respectively.

Subsequently, each component of the mobile terminal 10 is explained. The mobile terminal 10 has an application program 11, a driver 12 (corresponding to a transmission means), and an IC card 13. Each of these components is connected such that inputting/outputting of a signal is possible mutually via a bus.

When a user of the mobile terminal 10 directs exchange of electronic value, the application program 11 (hereinafter, referred to as "AP11") notifies the direction to the driver 12. Further, the AP11 detects completion of exchange of electronic value by the input of a callback function from the driver 12. At this time, if necessary, the completion of exchange is notified to the user of the mobile terminal 10.

The driver 12 has a common table 121 in which handlers are registered in relationship to a message. The driver 12 refers to the common table 121 for identifying a handler corresponding to the acquired message, and then executes the above-mentioned handler using the callback function corresponding to the handler. For example, when acquiring an exchange completion message "COMMITTED" from the IC card 13, the driver 12 executes a handler "notify to AP11" using the callback function "inform-ap (state)" corresponding thereto.

Here, an example of the internal configuration of the common table 121 is shown in FIG. 2(a). The common table 121 has a message region 121a, a handler region 121b, and a function region 121c. In the message region 121a, data of coded messages, such as an exchange direction, exchange offer, and exchange completion of electronic value (for example, "0X03", "0X05", . . . ), is stored. In the handler region 121b, the contents of processing to be executed by the occurrence of the corresponding message (event) as a trigger are registered as handlers (for example, "notify to AP11", "transmit to ICC23", . . . ). Further, in the function region 121c, the callback function and its parameters (for example, "inform-ap (state)", . . . ) for executing the corresponding handler as the need arises are registered in conjunction with the handler. The data in the common table 121 is registered by utilizing AP11 before the exchange processing of electronic value started.

In the IC card 13, electronic value V1 to be exchanged is stored. It is preferable for the IC card 13 to be configured by a tamper-resistant device from the standpoint of preservation of security such as, prevention of tampering and duplication of the electronic value V1. The electronic value V1 is representation (an embodiment) of some economical value put into electronic data and relevant examples include electronic money representative of the value of money and electronic tickets (book coupon, ticket coupon, etc.) provided in a prepaid scheme.

When the exchange direction message is input from the driver 12, the IC card 13 transmits the message as the exchange offer message to the mobile terminal 20 via the driver 12. Further, when the exchange completion message is input from an IC card 23 via a driver 22 and the driver 12, the IC card 13 outputs the exchange completion message to the driver 12 of the mobile terminal 10.

The mobile terminal 20 also has the same configuration as that of the mobile terminal 10. In other words, the mobile terminal 20 has an application program 21, the driver 22 (corresponding to the notification means), and the IC card 23 (corresponding to the exchange means). Each of these components is connected such that inputting/outputting of a signal is possible mutually via a bus.

The application program 21 (hereinafter, referred to as "AP21") presents the offer contents of the message to the user of the mobile terminal 20 in accordance with the callback function and the parameters input from the driver 22. The AP 21 stands by for the directive operation by the user and replies "OK" when there is a direction of consent and "NG", when not. When the callback function is input from the driver 22, the AP 21 notifies, with this as a trigger, the completion of exchange of electronic value to the user of the mobile terminal 20 as the need arises.

The driver 22 has a common table 221 (corresponding to a storage means) where data which is common to the data in the common table 121 of the mobile terminal 10 is registered. An example of the internal configuration of the common table 221 is shown in FIG. 2(b). The configuration of the common table 221 is the same as that of the common table 121 described above in detail, therefore, the symbols having the same series (the end of the symbol string is the same) are attached to the same data storage regions and the explanation is omitted. The driver 22 performs management of the handler corresponding to the message and the parameters with reference to the common table 221.

For example, upon receipt of an exchange offer message "OFFER (V1, V2)" transmitted from the mobile terminal 10, the driver 22 acquires the handler corresponding to this from the common table 221 and notifies the offer contents based on the handler to the AP21. When the consent for the offer contents is obtained, the driver 22 outputs the exchange offer message to the IC card 23 and directs to start exchange of electronic value. Further, when acquiring the exchange completion message "COMMITTED" from the IC card 23 on completion of the exchange of electronic value, the driver 22 executes the handler, "notify to the AP21" using the callback function "inform-ap (state)" corresponding to this.

When the exchange offer message "OFFER (V1, V2)" is input from the driver 22, the IC card 23, with this as a trigger, starts exchange processing of electronic value with the IC card 13 as a communication destination. The exchange processing is performed directly between the IC cards, not via the AP11 or AP21. In other words, the IC card 23 transmits the electronic value V2 stored therein to the IC card 13 via the drivers 22, 12 and a radio channel. Similarly, the IC card 13 transmits the electronic value V1 to the IC card 23 via the drivers 12, 22 and the radio line. When both the IC cards receive the electronic value of the other party, the exchange is completed.

Next, with reference to FIG. 3 and FIG. 4, the operation of an electronic value exchange system 100 in the present embodiment and each step constituting an electronic value exchange method according to the present invention are explained. As a premise of explanation, a situation is assumed in the present embodiment, in which exchange between the data V1 owned by the user A of the mobile terminal 10 and the data V2 owned by the user B of the mobile terminal 20 is desired. Further, prior to the start of exchange, it is assumed that the above-described common table 121 (refer to FIG. 2(a)) is registered in the mobile terminal 10 and the common table 221 (refer to FIG. 2(b)), in the mobile terminal 20, respectively.

First, when directed from the user A of the mobile terminal 10 (S1 in FIG. 3), the AP11 directs the driver 12 to exchange electronic value using the API (Application Program Interface) (S2). As a function that directs to start exchange, for example, "exe-exchange (ICC13, ICC23, V1, V2)" is used.

The driver 12 having received exchange direction creates an exchange direction message having "ICC23, V1, V2" as parameters by transforming the above-mentioned API into a message (S3). The driver 12 transfers the exchange direction message to the IC card 13 described on the destination header (S4).

Upon receipt of the exchange direction message, the IC card 13 transmits the exchange offer message having the data (V1, V2) to be exchanged as parameters toward the driver 22 of the IC card 23, the other party of the communication (S5). The exchange offer message is transmitted via the driver 12 and can be represented by OFFER (V1, V2).

When detecting the reception of the message, the driver 22 on the mobile terminal 20 side collates the message with the message in the common table 221 and acquires a handler corresponding to the message if there is a match (S6). Since "0X03", which is coded "OFFER", is registered in the message region 221a in the common table 221, in S6, the handler "notify to AP21" corresponding thereto is acquired.

In S7, the driver 22 delivers the parameters of the message to the AP21 as the offer contents, in accordance with the description of the handler acquired in S6. Specifically, the driver 22 extracts the parameters "V1, V2" from the callback function (for example, cfm-prop, which is one of the SPI functions) corresponding to the acquired handler and outputs them to the AP21 with the above-mentioned callback function. The AP21 having received the offer contents judges whether or not consent is to be given to the offer contents, based on the direction by the user B of the mobile terminal 20 (S8). When the user B directs consent (S8; YES), the AP21 returns an affirmative reply "OK" to the driver 22 (S9). The driver 22 judges that the user B consents to the offer contents by the reply "OK" and outputs the exchange offer message (OFFER (V1, V2)) received in S5 to the IC card 23 (S10).

With the inputting of the exchange offer message to the IC card 23 as a trigger, between the IC card 13 and the IC card 23, exchange of the electronic value owned by the respective cards is started (S11). The transmission/reception processing of the electronic value in S11 is performed via the driver (that is, directly) but completed not via the application program. Due to this, interception and tampering of the electronic value are prevented and a high security level is maintained.

By the way, in S8, if the user B refuses (S8; NO), the AP21 returns a negative reply "NG" to the driver 22 (S12). The driver 22 having received the negative replay notifies an error to the message to the IC card 13 via the driver 12 (S13). Due to this, the IC card 13 detects that exchange of electronic value is refused.

In FIG. 4, when the exchange of electronic value is completed, that is, when the IC card 23 acquires the electronic value V1, the IC card 23 transmits the exchange completion message ("COMMIT" on the transmission side) to the IC card 13 via the drivers 22, 12 (S14). At the time of transmission, the same processing as that in the above-mentioned S6, S7 is also executed. In other words, when transmitting the exchange completion message, the driver 22 on the mobile terminal 20 side collates the message with the message in the common table 221 and acquires a handler corresponding to the message if there is a match (S15). Since "0X10", which is coded "COMMIT", is registered in the message region 221a in the common table 221, in S15, the handler "notify to AP21" corresponding thereto is acquired again.

In S16, the driver 22 delivers the parameters of the message to the AP21 as the offer contents, in accordance with the description of the handler acquired in S15. Specifically, the driver 22 extracts the parameter "state" from the callback function (for example, inform-ap) corresponding to the acquired handler and outputs it to the AP21 with the above-mentioned callback function. Due to this, the AP 21 recognizes that the exchange of electronic value has been completed normally.

On the other hand, after receiving the exchange completion message ("COMMITTED" because of being on the reception side) transmitted in S14 (S17), the IC card 13 outputs this to the AP11 via the driver 12. At the time of notification of exchange completion also, the table 121 is referred to (S18).

The AP11 cannot receive the message from the IC card 13 directly but the interposed driver 12 notifies the AP11 of the above-mentioned message contents (a state of exchange completion) by executing the handler corresponding to the message registered in the table 121. For the notification of the message, same to the processing in S16, the callback function having "state" as a parameter (for example, inform-ap) is used (S19). With the processing in S17, the AP11 recognizes that the exchange of electronic value has been completed normally.

The electronic value exchange system 100 explained above has the following function and effect. First, the driver 22 on the receiver side holds in advance the table 221 in which the contents of processing for the event that occurs is registered and each time an event occurs, notifies the contents of processing requested to the AP21 by referring thereto. In the direct exchange of the electronic value between IC cards, while high security is ensured, it is difficult for the AP21 to grasp the details processed between the IC cards in a realtime manner, however, such a possible trouble is resolved by the above-mentioned notification. In other words, it is possible that the mobile terminal has a function to cause the driver to monitor the message that reaches the IC card on the receiver side. Since the monitoring result is notified to the application program, it is possible for the application program to grasp the processing on the IC card side at all times.

Second, also when the exchange of electronic value is completed, the driver 22 on the receiver side notifies the AP21 that the exchange is completed, by referring to the table 221. In the same manner, when the exchange of electronic value is completed, the driver 12 on the sender side notifies the AP11 that the exchange is completed, by referring to the table 121. In other words, both of the application programs of the mobile terminals 10, 20 that have effected exchange of electronic value can recognize that the exchange has been completed normally, therefore, it is made possible to judge that the exchange of electronic value has not been completed normally, when at least one of the above-mentioned notifications is not received.

By the way, factors that do not cause the exchange of electronic value to complete normally include line disconnection due to the reduction in communication resources and a direction to abort by the mobile terminal. When the processing of exchange of electronic value is aborted, it is possible for the mobile terminal 10 or the mobile terminal 20 to connect to a communication controller installed outside the electronic value exchange system 100. The communication controller is operated and managed by the TTP (Trusted Third Party) and determines whether to abort or continue the above-mentioned exchange processing.

Further, it is possible for the electronic value exchange system 100 to, asynchronously notify the application program of only the minimum required information depending on the judgment of the user while maintaining the confidentiality of the processing in the IC card. Due to this, an increase in the processing load of the IC card can be suppressed.

INDUSTRIAL APPLICABILITY

The present invention has a use application in exchange between users of electronic money or electronic ticket stored in an IC card that can be attached to and detached from a mobile phone etc., and guarantees the confidentiality and reliability.

The invention claimed is:

1. An electronic value exchange system for effecting exchange of electronic value held in an IC card of each terminal between a sender side terminal and a receiver side terminal, wherein:
   the sender side terminal comprises:
      a first IC card configured to hold a first electronic value;
      a transmitter configured to transmit an exchange offer message offering exchange of the first electronic value to the receiver side terminal; and
   the receiver side terminal comprises:
      a second IC card configured to hold a second electronic value;
      a memory configured to store a handler indicating contents of processing to be executed in relationship to a message; and
      a driver configured to, upon receipt of the exchange offer message transmitted by the sender side terminal, acquire a handler corresponding to the exchange offer message from the memory to notify the offer contents based on the handler to an application program, and to effect exchange of the second electronic value by transmitting the second electronic value to the sender side terminal when the consent for the offer contents notified to the application program is obtained from the application program.

2. The electronic value exchange system according to claim 1, wherein
   the driver effects exchange of the electronic value by transmitting the electronic value to the sender side terminal not via the application program.

3. A mobile terminal for effecting exchange of electronic value held in an IC card of the terminal with another mobile terminal, comprising:
   an IC card configured to hold a first electronic value;
   a memory configured to store a handler indicating contents of processing to be executed in relationship to a message; and
   a driver configured to, upon receipt of an exchange offer message offering exchange of a second electronic value transmitted from said another mobile terminal, acquire a handler corresponding to the exchange offer message from the memory to notify the offer contents based on the handler to an application program, and to effect exchange of the first electronic value by transmitting the first electronic value to said another mobile terminal when the consent for the offer contents notified to the application program is obtained from the application program.

4. The mobile terminal according to claim 3, wherein
   when detecting that the exchange of the first electronic value is completed, the driver acquires a handler corresponding to an exchange completion message from the memory and notifies the completion of exchange to the application program and said another mobile terminal in accordance with the handler.

5. The mobile terminal according to claim 3, wherein
   the IC card is configured by a tamper-resistant device.

6. An electronic value exchange method comprising:
   a transmission step in which a sender side terminal transmits an exchange offer message for offering exchange of a first electronic value stored in a first IC card of the sender side terminal to a receiver side terminal;
   a notification step in which the receiver side terminal having a memory configured to store a handler indicating the contents of processing to be executed in relationship to a message, upon receipt of the exchange offer message transmitted in the transmission step, acquires a handler corresponding to the exchange offer message from the memory and notifies the offer contents based on the handler to an application program; and an exchange step in which, when the consent for the offer contents notified in the notification step is obtained from the application program, exchange of a second electronic value stored in a second IC card of the receiver side terminal is effected by transmitting the second electronic value to the sender side terminal.

* * * * *